Figure 1:
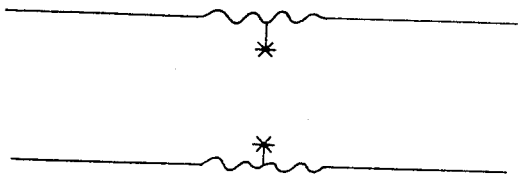
Figure 2:
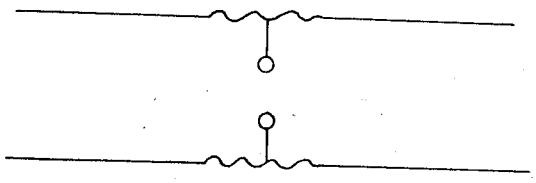
Figure 3:
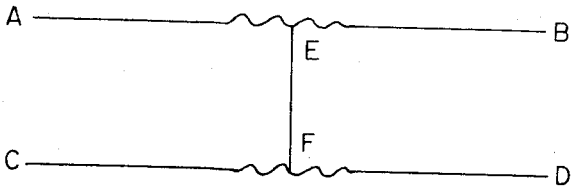

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 30, 1973

915 O.G. 1568

T915,009

CONJUCTIVE POLYMERS

Michael Fryd, Broomall, Pa., and David K. Wald, Cherry Hill, N.J., assignors to E. I. du Pont de Nemours and Company, Wilmington, Del.

Continuation of abandoned application Ser. No. 867,688, Oct. 20, 1969. This application May 19, 1972, Ser. No. 255,135

Int. Cl. C08f *15/40*

U.S. Cl. 260—875

1 Sheet Drawing. 13 Pages Specification

Conjunctive polymers having (a) two or more base portions each of which, as an entity before oxidation, is a copolymer of one or more ethylenically unsaturated monomers and one or more unsaturated aldehyde monomers, and (b) one or more conjunct portions each of which, as an entity, is an acrylate or methacrylate polymer, a vinyl ester polymer or a vinyl halide polymer, and coating compositions containing these conjunctive polymers.

Oct. 30, 1973

M. FRYD ET AL

T915,009

CONJUNCTIVE POLYMERS

Filed May 19, 1972

INVENTORS

MICHAEL FRYD

DAVID K. WALD

BY Fred J. Butzi

ATTORNEY